(No Model.)

J. E. H. HYDE.
TOY.

No. 578,749. Patented Mar. 16, 1897.

WITNESSES:

INVENTOR

UNITED STATES PATENT OFFICE.

JOHN E. HINDON HYDE, OF NEW YORK, N. Y.

TOY.

SPECIFICATION forming part of Letters Patent No. 578,749, dated March 16, 1897.

Application filed May 22, 1896. Serial No. 592,636. (No model.)

*To all whom it may concern:*

Be it known that I, JOHN EDMUND HINDON HYDE, a citizen of the United States, and a resident of the city of New York, in the county and State of New York, have invented certain new and useful Improvements in Toys, of which the following is a full, true, and accurate description, reference being had to the accompanying drawings, showing one construction embodying my invention, and in which similar letters of reference indicate corresponding parts throughout both views.

The object of my invention is to produce a toy which will, at the same time that it affords amusement and unconscious instruction to the child in the appreciation of colors and sounds, also furnish a means of observing the effect upon the child by the presentation of different colors to the eye of the child and of different sounds to the ear.

Figure 1:
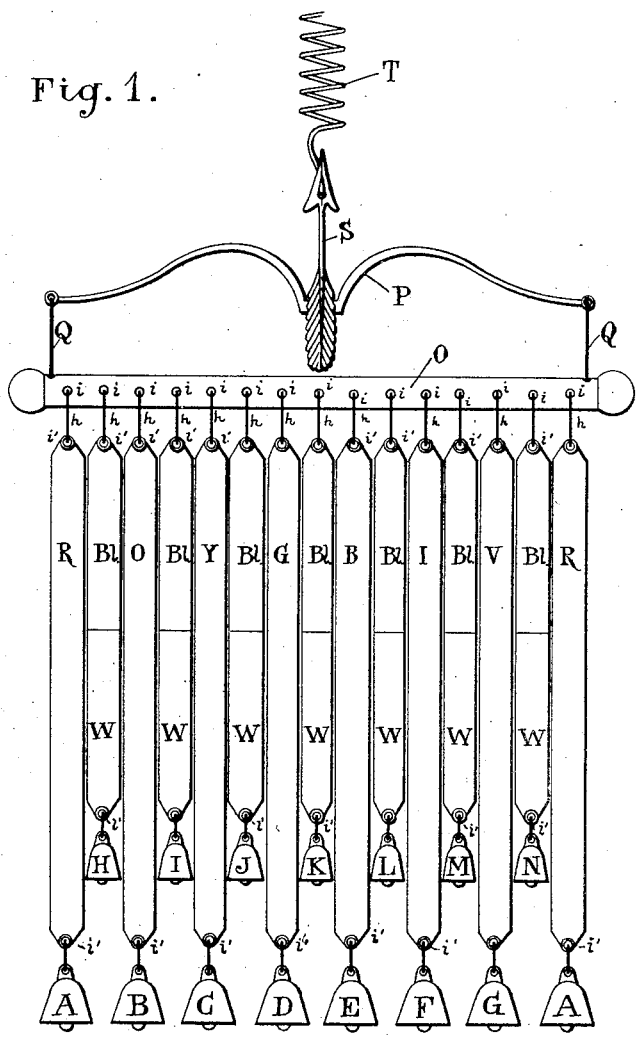
Figure 2:
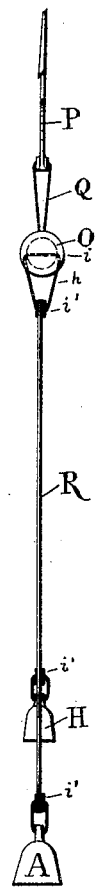

Figure 1 is a front view of the form illustrated, and Fig. 2 is a side view of the same.

I have chosen to illustrate a form of my invention which presents all the possibilities of its use that can be presented without a great multiplicity of figures and which is adapted to indicate the extent and variety of uses to which the invention can be applied.

In the form illustrated, Fig. 1 shows a number of differently-colored ribbons or strips removably attached to an elastic support and in which the support also permits of a rotary movement, thus providing for universal motion, and with bells hanging from the lower ends of the dependent differently-colored ribbons, each ribbon having a bell attached to its free end of a tone corresponding to the musical scale.

Referring to Fig. 1, O is a bar which contains eyes $i$ and which is suspended by elastic cords Q, attached to the ends of an elastic bow P. This bow hangs from a coil-spring T, which can be attached to a fixed support (not shown in the drawings) by any suitable means. The ribbons or strips in Fig. 1 are fifteen in number and are shown as arranged in the order of the colors of the spectrum, with a red ribbon added beyond the violet to complete the octave and with intermediate ribbons of black and white, these latter strips being intended to indicate the absence of color (by means of the black) and the union of all the colors of the solar spectrum to compose the white light, and having bells of the semitones attached to the ends thereof. Thus, beginning on the left-hand side of the figure, the first ribbon is red, (R,) the next black and white, the next orange, (O,) the next black and white, the next yellow, (Y,) the next black and white, the next green, (G,) the next black and white, the next indigo, (I,) the next black and white, the next violet, (V,) the next black and white, and the next red, (R.) All these ribbons are shown as having an eye $i'$ at either end, and they are removably suspended from the bar O by means of hooks $h$, which engage with the eyes $i$ in the bar and the eyes $i'$ in the ribbons. Bells are attached to the lower ends of these strips or ribbons by hooks and eyes, as illustrated. As illustrated, the bells attached to the longer strips or those which correspond to the colors of the spectrum, with the eighth ribbon (red) added, composing the chromatic scale, are bells toned to the different notes of the octave in their order, A B C D E F G A, and the shorter strips of black and white ribbon have attached to them bells H I J K L M N, which correspond to the semitones. It will thus be seen that when the child pulls any one of the bells there will result through the elasticity of the support a vibration of some or all of the bells, depending upon the force and character of the pull and its effect upon the elastic support.

The object of the universal motion is to direct the child's attention to different portions of the device, as well as to permit of variety in the sounds produced by the action of a child so young as not to consciously make a variety of movements calculated to produce different effects, and the ribbons should be broad enough and sufficient in number to cause the child's eye to move over a considerable plane to prevent a fixed gaze at any single point. The ribbons should preferably have sufficient free individual movement to cause contrast of the different colors and the possible combination of two or more colors crossing each other, so as to make a combination where the colors are seen by transmitted light, thus the blue and yellow ribbons crossing making green, the red and yellow ribbons crossing making orange, and the red and blue ribbons crossing making a violet or purple, &c.

It is obvious that the invention is susceptible of use in making a large number of experiments and for a wide range of instruction, even for grown persons. Thus by having all the ribbons of one color, half of them of one color and half of them of another color, (two colors in all only,) or in any other combinations desired, various physiological effects may be produced upon the child, according to the colors chosen, the violet half of the spectrum tending to have a soothing or quieting effect upon the child, and the colors corresponding to the orange or red half of the spectrum may produce a different effect, which may be modified according to the tones of the bells which are suspended from the ribbons in use.

The invention is also calculated to teach the elements of music—harmony, discord, the octave, chords, sharps and flats, the semitones, &c.—as well as a knowledge of colors, while it is also capable of furnishing an experimenter with the means of determining the physiological effects produced by the simultaneous presentation of different colors to the eye and different sounds to the ear.

It is obvious that the number, color, and order of arrangement of the ribbons may be varied at will, and also that the number, difference in order, and difference in tone of the bells may be varied at will, and of course the methods of attaching the bells to the ribbons and the ribbons to the elastic support may also be varied. There may be also a wide variation in the particular construction of the support from which the ribbons and bells are suspended, and it is not essential that the support should be an elastic one. All of these variations may be made without departing from but in order to fully utilize the invention. So, too, the ribbons may be made of different materials, such as silk, satin, linen, cotton, velvet, celluloid, &c., but preferably smooth on one side and rough on the other, in order to offer a contrast to the sense of touch. So, too, the bells may be of the character shown, or they may be round like sleigh-bells or of any other convenient form. It will be within the scope of my invention also if the bells do not all differ in tone, and also if the bells are not toned with absolute correctness to true musical notes, the invention being designed to furnish an instrument which shall amuse at the same time that it instructs. Further, the bells may be made rough or smooth on the surface and may be variously colored, as desired, with a view to developing the sense of touch, and such difference in color may be given by a choice in the metal of which the bells are composed or by a treatment of the metal, such as plating, oxidizing with acid, staining, &c.

Having thus described my invention and illustrated it in one form, what I claim is—

1. In a toy; a support, a plurality of ribbons suspended from said support, and each of said ribbons having a bell attached at the free end thereof, the ribbons differing from each other in color, and the bells differing in tone, substantially as described.

2. In a toy; a support, a plurality of ribbons detachably suspended from said support and each of said ribbons having a bell attached at the free end thereof, the ribbons differing from each other in color, and the bells differing in tone, substantially as described.

3. In a toy; a support, a plurality of ribbons detachably suspended from said support and each of said ribbons having a bell detachably suspended from the free end thereof, the said ribbons differing from each other in color, and the bells differing in tone, substantially as described.

In witness whereof I have hereunto signed my name this 21st day of May, 1896.

J. E. HINDON HYDE.

In presence of—
JAMES J. COSGROVE,
W. H. BERRIGAN, Jr.